US011026217B2

(12) United States Patent
Chae et al.

(10) Patent No.: US 11,026,217 B2
(45) Date of Patent: Jun. 1, 2021

(54) SIDELINK SIGNAL TRANSMISSION/RECEPTION METHOD OF UE IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Myoungseob Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 16/300,532

(22) PCT Filed: May 12, 2017

(86) PCT No.: PCT/KR2017/004952
§ 371 (c)(1),
(2) Date: Nov. 9, 2018

(87) PCT Pub. No.: WO2017/196129
PCT Pub. Date: Nov. 16, 2017

(65) Prior Publication Data
US 2019/0230633 A1   Jul. 25, 2019

Related U.S. Application Data

(60) Provisional application No. 62/335,675, filed on May 12, 2016, provisional application No. 62/336,544, filed on May 13, 2016.

(51) Int. Cl.
H04W 72/04    (2009.01)
H04L 5/00     (2006.01)
H04W 4/44     (2018.01)

(52) U.S. Cl.
CPC .......... *H04W 72/042* (2013.01); *H04L 5/00* (2013.01); *H04W 4/44* (2018.02)

(58) Field of Classification Search
CPC ... H04W 4/40; H04W 72/12; H04W 72/0406; H04W 72/04; H04W 72/1263; H04W 4/70; H04W 4/44; H04W 4/46; H04W 84/005
See application file for complete search history.

(56) References Cited

U.S. PATENT DOCUMENTS

2014/0161088 A1*  6/2014  Seo ............... H04W 52/0216
                                                    370/329
2016/0044665 A1   2/2016  Novlan et al.
(Continued)

FOREIGN PATENT DOCUMENTS

WO   2016021902   2/2016
WO   2016021929   2/2016
(Continued)

OTHER PUBLICATIONS

European Patent Office Application Serial No. 17796429.3, Search Report dated Nov. 14, 2019, 14 pages.
(Continued)

*Primary Examiner* — Gregory B Sefcheck
*Assistant Examiner* — Debebe A Asefa
(74) *Attorney, Agent, or Firm* — Lee Hong Degerman Kang Waimey

(57) ABSTRACT

In one embodiment of the present invention, disclosed is a sidelink signal transmission/reception method by which user equipment (UE) transmits/receives a sidelink signal in a wireless communication system, comprising the steps of: allowing the UE to receive, in subframe n, a DCI including a timer resource pattern for transmission (T-RPT) from a base station; allowing the UE to transmit a physical sidelink
(Continued)

control channel (PSCCH) in a sidelink subframe after n+4; allowing the UE to apply the T-RPT to subframes after a PSCCH-physical sidelink shared channel (PSCCH-PSSCH) offset from the subframe having transmitted the PSCCH; and allowing the UE to transmit the PSSCH in the subframes indicated in the T-RPT.

12 Claims, 11 Drawing Sheets

(56) References Cited

U.S. PATENT DOCUMENTS

| | | | |
|---|---|---|---|
| 2017/0188391 A1* | 6/2017 | Rajagopal | H04W 74/0816 |
| 2017/0215183 A1* | 7/2017 | Gulati | H04L 1/1812 |
| 2019/0053251 A1* | 2/2019 | Loehr | H04W 72/1263 |
| 2019/0116565 A1* | 4/2019 | Chae | H04W 24/10 |

FOREIGN PATENT DOCUMENTS

| | | |
|---|---|---|
| WO | 2016022200 | 2/2016 |
| WO | 2016028126 | 2/2016 |

OTHER PUBLICATIONS

PCT International Application No. PCT/KR2017/004952, Written Opinion of the International Searching Authority dated Aug. 29, 2017, 24 pages.

Nec, "Enhancement to resource pool structure of PC5-based V2V", 3GPP TSG RAN WG1 Meeting #84, R1-160394, Feb. 2016, 4 pages.

Catr, "Considerations on SA content for V2V", 3GPP TSG RAN WG1 Meeting #84bis, R1-163126, Apr. 2016, 3 pages.

* cited by examiner

FIG. 5
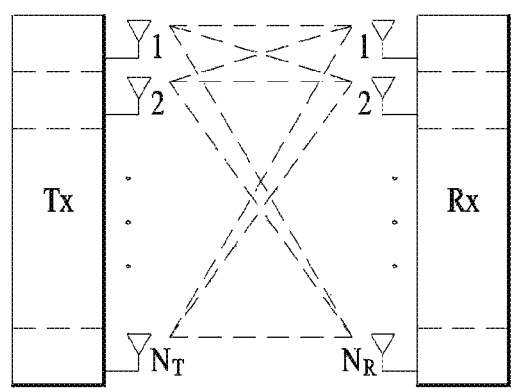
(a)
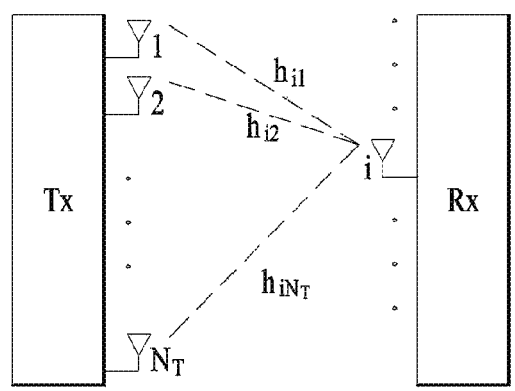
(b)

FIG. 8
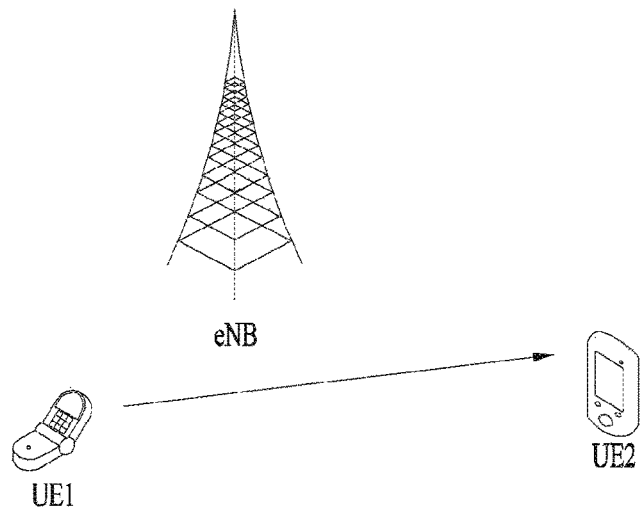
(a)
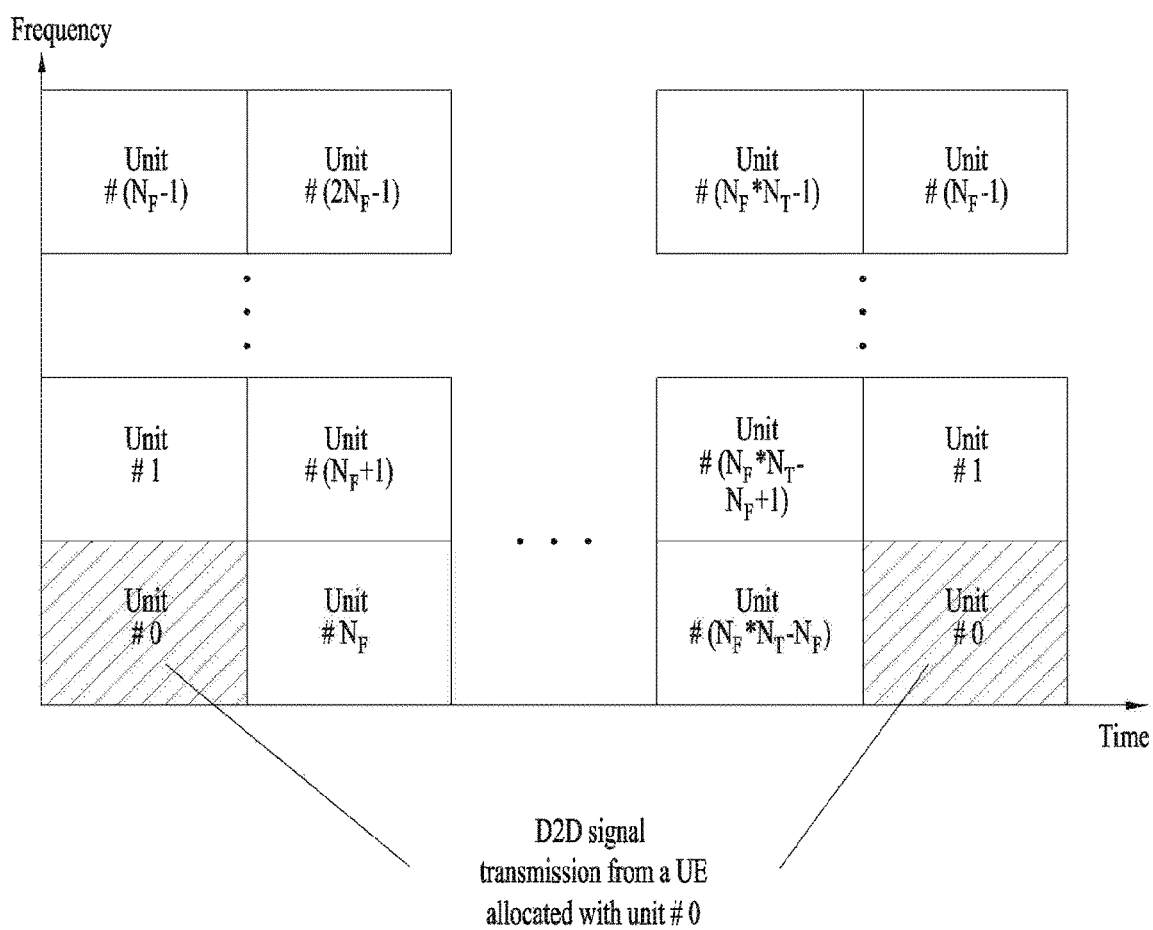
(b)

SIDELINK SIGNAL TRANSMISSION/RECEPTION METHOD OF UE IN WIRELESS COMMUNICATION SYSTEM

CROSS-REFERENCE TO RELATED APPLICATIONS

This application is the National Stage filing under 35 U.S.C. 371 of International Application No. PCT/KR2017/004952, filed on May 12, 2017, which claims the benefit of U.S. Provisional Application Nos. 62/335,675, filed on May 12, 2016, and 62/336,544, filed on May 13, 2016, the contents of which are all hereby incorporated by reference herein in their entirety.

TECHNICAL FIELD

The present invention relates to a wireless communication system, and more particularly, to a method in which a User Equipment (UE) transmits and receives sidelink signals after receiving Downlink Control Information (DCI) transmitted from a base station and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

The technical task of the present invention is to provide an operation for a UE to transmit and receive sidelink signals after receiving DCI from a BS and DCI format therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, there is provided a method of transmitting and receiving sidelink signals by a User Equipment (UE) in a wireless communication system. The method may include: receiving, by the UE, Downlink Control Information (DCI) including a Time Resource Pattern for Transmission (T-RPT) in subframe n from a base station; transmitting, by the UE, a Physical Sidelink Control Channel (PSCCH) in a sidelink subframe after subframe (n+4); applying, by the UE, the T-RPT starting from a subframe at a PSCCH-Physical Sidelink Shared Channel (PSSCH) offset from the subframe in which the PSCCH is transmitted; and transmitting, by the UE, a PSSCH in subframes indicated by the T-RPT.

In another aspect of the present invention, there is provided a User Equipment (UE) for transmitting and receiving sidelink signals in a wireless communication system. The UE may include: a transmitting module; a receiving module; and a processor. The processor may be configured to receive Downlink Control Information (DCI) including a Time Resource Pattern for Transmission (T-RPT) in subframe n from a base station through the receiving module, transmit a Physical Sidelink Control Channel (PSCCH) in a sidelink subframe after subframe (n+4) through the transmitting module, apply the T-RPT starting from a subframe at a PSCCH-Physical Sidelink Shared Channel (PSSCH) offset from the subframe in which the PSCCH is transmitted; and transmit a PSSCH in subframes indicated by the T-RPT.

Among the subframes indicated by the T-RPT, at least one subframe in which a second or later PSSCH is to be transmitted may be retransmission of a first PSSCH.

The PSCCH may include a T-RPT identical to the T-RPT received through the DCI.

The subframes indicated by the T-RPT may include the PSCCH.

The PSCCH and PSSCH may be Frequency Division Multiplexed (FDMed) in the subframes indicated by the T-RPT.

Repeated application of the T-RPT may not be allowed.

The PSCCH may be transmitted in a first sidelink subframe after subframe (n+4).

The PSCCH may be transmitted in a subframe indicated by the DCI among sidelink subframes after subframe (n+4).

A first UE may be a Vehicle-to-Everything (V2X) UE.

Frequency resources for transmitting the PSSCH may be indicated on a sub-channel basis.

A start location of frequency resources for transmitting the PSSCH may be derived from a location of frequency resources for transmitting the PSCCH.

The DCI may include a distributed/localized frequency allocation indicator.

The DCI may include at least one of a Transmit Power Control (TPC) command, a Semi-Persistent Scheduling (SPS) configuration index, and an activation/release field.

Advantageous Effects

According to the present invention, it is possible to use DCI optimized for V2X operation.

It will be appreciated by persons skilled in the art that the objects that could be achieved with the present invention are not limited to what has been particularly described hereinabove and other objects that the present invention could achieve will be more clearly understood from the following detailed description.

DESCRIPTION OF DRAWINGS

The accompanying drawings, which are included to provide a further understanding of the present invention and are incorporated in and constitute a part of this application, illustrate embodiments of the present invention and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE FOR INVENTION

Figure 1:
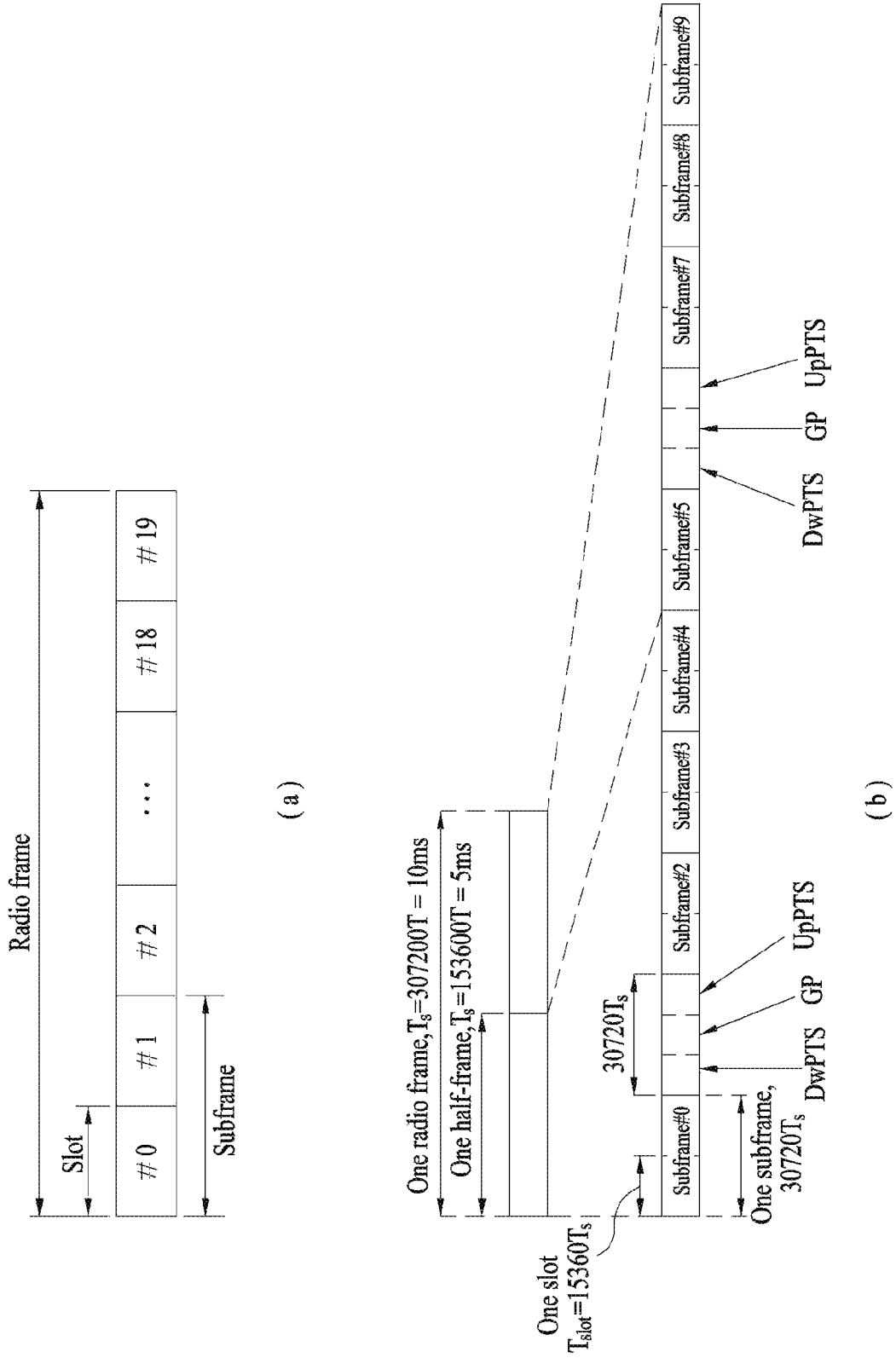
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
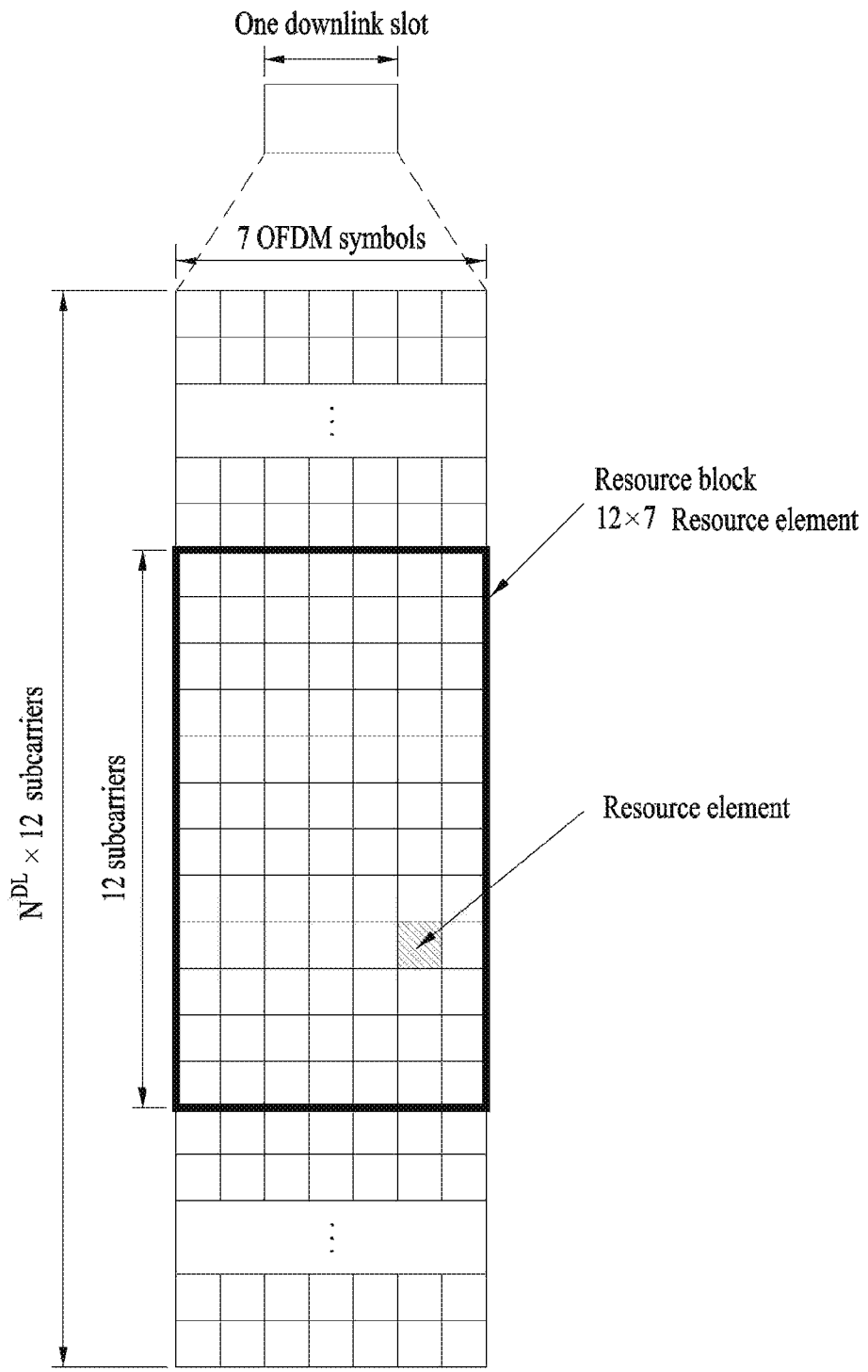
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
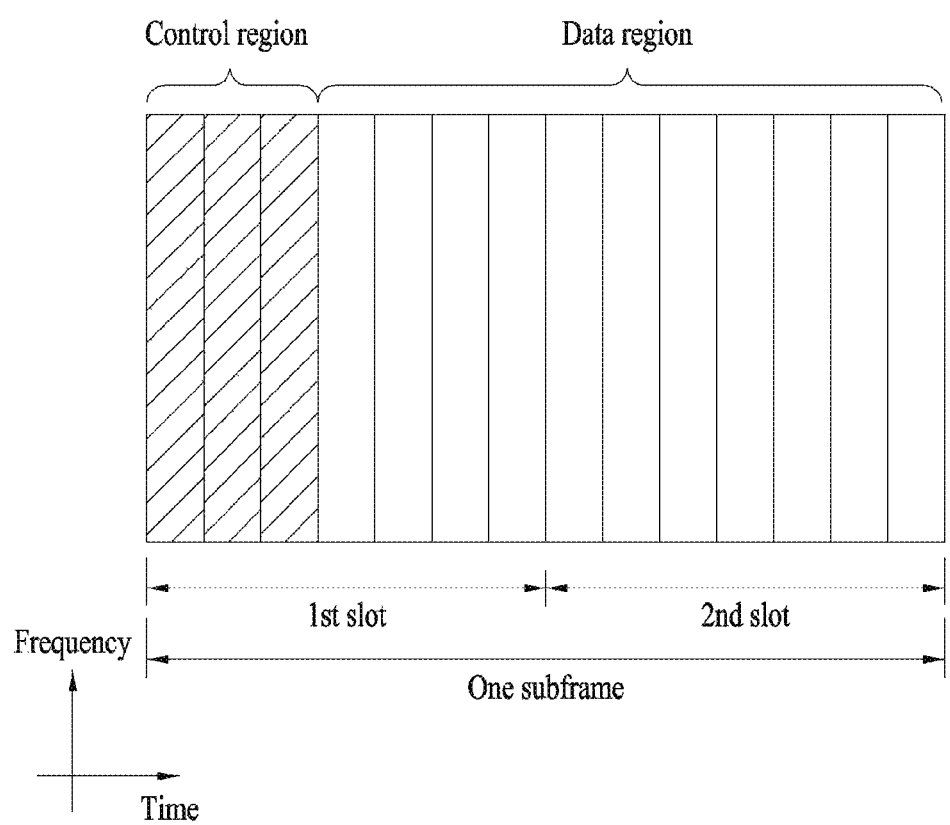
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
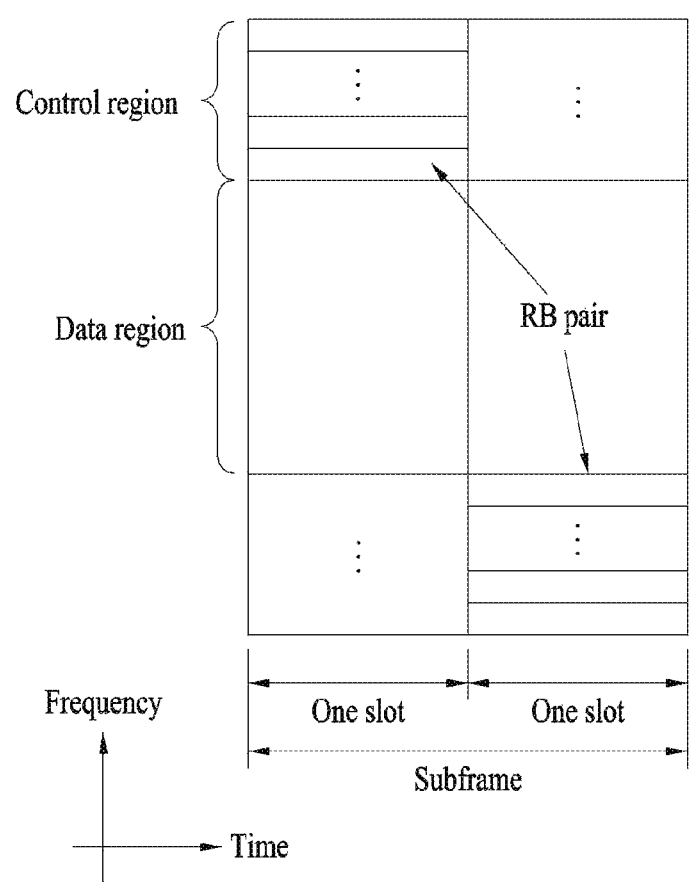
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2},\ldots,h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1$, $n_2, \ldots, n_{N_R}$ respectively added to the $N_R$ Rx antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T,N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
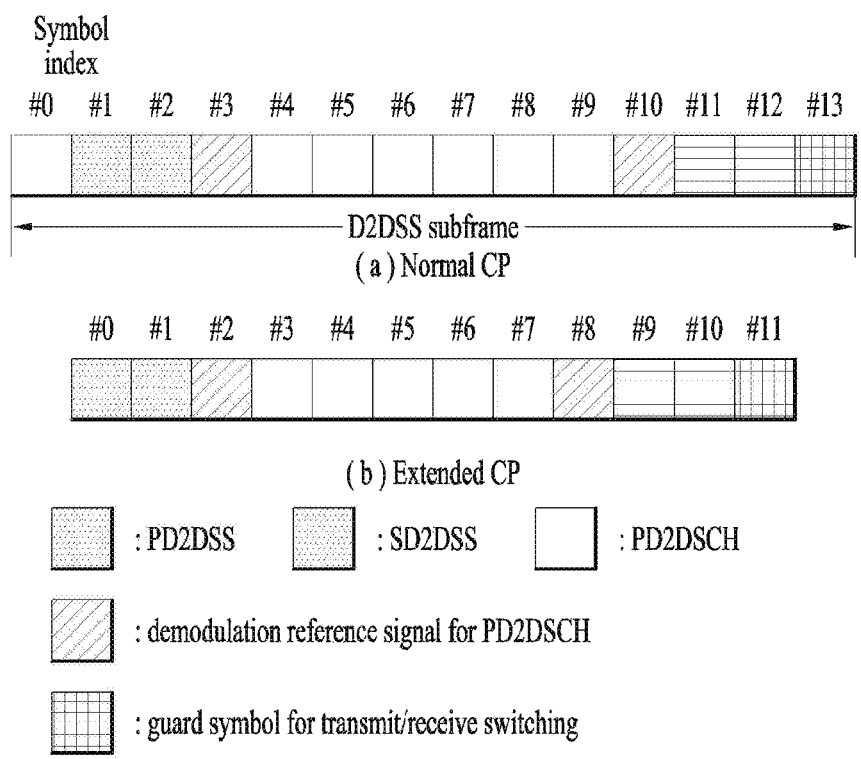
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
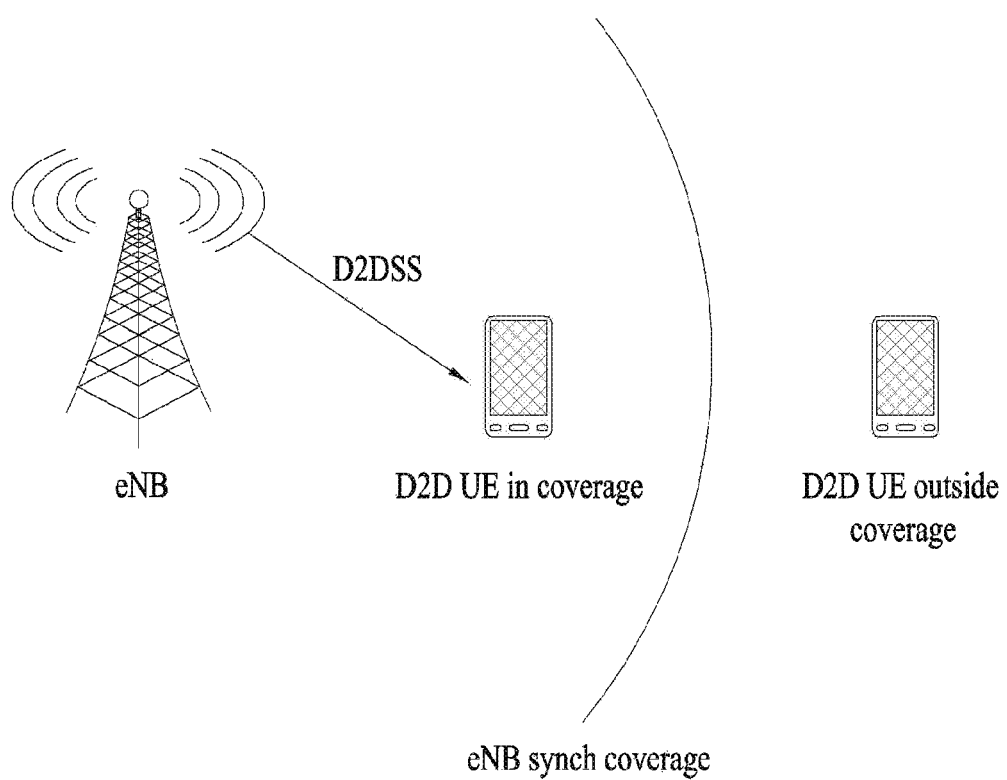
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
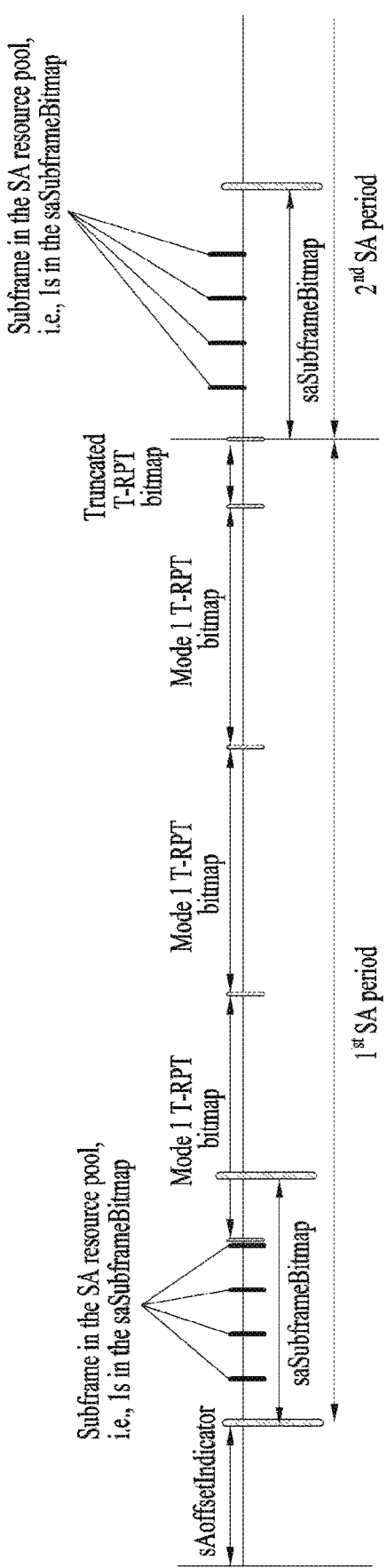
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

Meanwhile, in V2V communication, a cooperative awareness message (CAM) of a periodic message type, a decentralized environmental notification message (DENM) of an event triggered message type, or the like may be transmitted. The CAM may include dynamic state information about a vehicle, such as the direction and speed of the vehicle, vehicle static data such as the dimensions of the vehicle, and basic vehicle information such as an ambient illumination state and path details. The CAM may be 50 to 300 bytes long. The DENM may be a message generated upon occurrence of an unexpected incident such as breakdown or an accident of a vehicle. The DENM may be shorter than 3000 bytes, and received by all vehicles within its transmission range. The DENM may have priority over the CAM. When it is said that a message has priority, this means to a UE that if messages are to be transmitted at the same time, a message having a higher priority is transmitted above all, or a message with a higher priority among a plurality of messages is transmitted earlier in time. From the perspective of a plurality of UEs, a high-priority message is made less vulnerable to interference than a low-priority message, thereby having a reduced reception error probability. The CAM may have a larger message size with security overhead than without security overhead.

In LTE Release 12/13, DCI format 5 for the conventional D2D communication has been defined. DCI format 5 may include a 6-bit SA resource, 5-to-13-bit data resource allocation, a 1-bit frequency hopping flag, a 1-bit TPC command, and a 7-bit Time Resource Pattern for Transmission (T-RPT). Hereinafter, DCI for V2X operation and relevant UE operation will be described with reference to the embodiments of the present invention.

UE Operation Related to DCI

Figure 10:
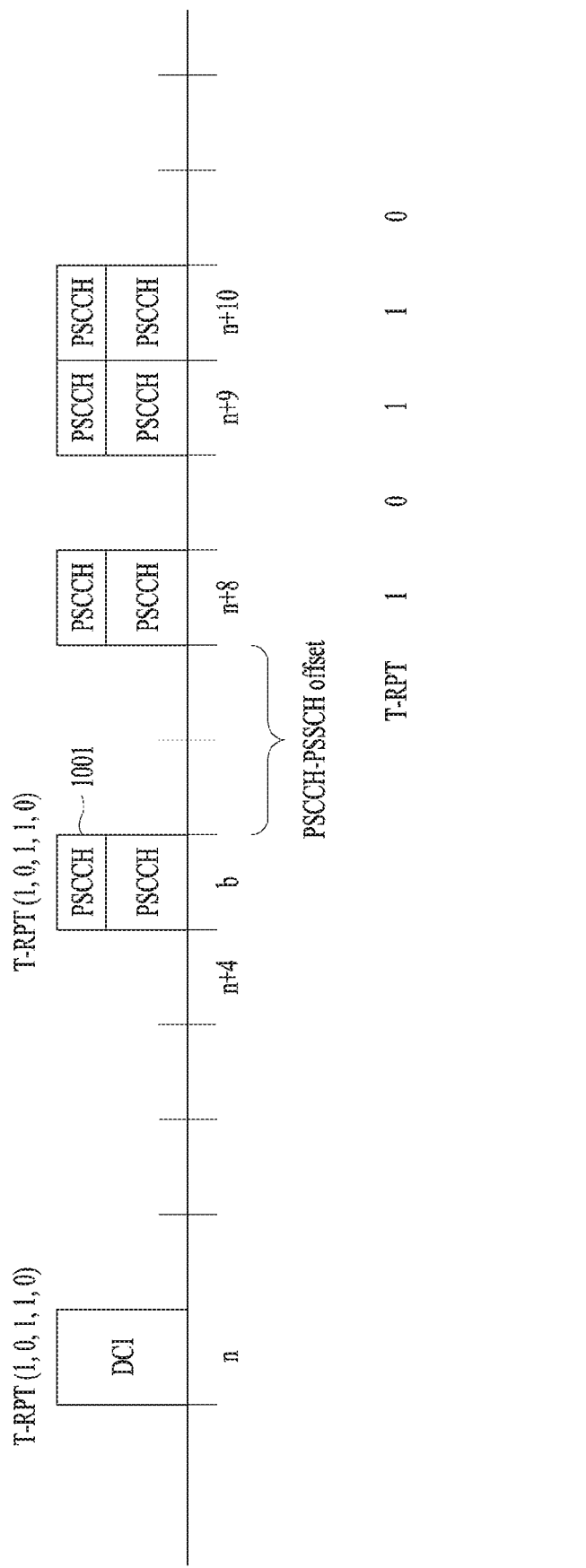
FIG. 10 is a flowchart illustrating an embodiment of the present disclosure.

FIG. 10 illustrates operations performed by a (V2X) UE to receive DCI from an eNB and transmit a PSCCH and a PSSCH according to an embodiment of the present invention. Here, the DCI may include at least one piece of the information which will be described later in the section entitled DCI Detail.

Referring to FIG. 10, a UE may receive DCI including a Time Resource Pattern for Transmission (T-RPT) in subframe n from an eNB. Thereafter, the UE may transmit a PSCCH 1001 in a sidelink subframe after subframe (n+4) (subframe b in FIG. 10). The UE may apply the T-RPT starting from a subframe at a PSCCH-PSSCH offset (i.e., a time offset between PSCCH/PSSCH) from the subframe in which the PSCCH is transmitted. The UE may transmit a PSSCH in subframes indicated by the T-RPT (that is, subframes of which the T-RPT values are 1). In FIG. 10, the PSSCH may be transmitted in subframes (n+8), (n+9), and (n+10) because their T-RPT values are 1.

In this case, among the subframes indicated by the T-RPT, at least one subframe in which a second or later PSSCH is to be transmitted may be retransmission of a first PSSCH. In other words, the DCI may schedule multiple retransmission at once. The PSCCH 1001 may include a T-RPT identical to the T-RPT received through the DCI. Using this T-RPT, the UE may perform PSCCH transmission/retransmission as scheduled by the eNB and then inform other UEs of the PSCCH transmission/retransmission.

The subframes indicated by the T-RPT may include the PSCCH. That is, the PSCCH and PSSCH may be Frequency Division Multiplexed (FDMed) in the subframes indicated by the T-RPT. In this case, repeated application of the T-RPT may not be allowed. Alternatively, the T-RPT may be repeatedly applied by a predetermined number of times.

Regarding the PSCCH transmission, the PSCCH may be transmitted in a first sidelink subframe after subframe (n+4). It is assumed in FIG. 10 that subframe b is the first sidelink subframe after subframe (n+4). As another example, the PSCCH may be transmitted in a subframe indicated by the DCI among sidelink subframes after subframe (n+4). To this end, an extra T-RPT for the PSCCH may be included in the DCI.

Meanwhile, the above-described contents may be limited to time resources for transmitting the PSSCH. In this case, frequency resources for transmitting the PSSCH may be indicated on a sub-channel basis. A start location of the frequency resources for transmitting the PSSCH may be derived from the location of frequency resources for transmitting the PSCCH. To this end, only the end location of data may be signaled.

DCI Detail

Hereinafter, the DCI used in the above-mentioned UE operation will be described in detail. However, it should be noted that the aforementioned UE operation is performed based on one of various combinations of information included in the following DCI format.

According to an embodiment of the present invention, DCI for V2X sidelink communication may include PSSCH resource information, PSCCH resource information, a TPC command, ID information, a distributed/localized frequency allocation indicator, an SPS configuration index, activation/release, etc. Details thereof will be described sequentially below.

The DCI format for V2X may include the PSCCH/PSSCH resource information. The PSCCH resource information may be composed of a time resource index and frequency resource allocation information. First, regarding the time resource index, if DCI schedules multiple retransmission at once, a T-RPT may be included in the DCI to be transmitted. In particular, this method is efficient in that the size of an indication field can be reduced by scheduling multiple PSCCHs/PSSCHs through a single piece of DCI. The T-RPT may have a length shorter than the conventional 7-bit T-RPT. If the DCI is received in subframe n, the T-RPT may be transmitted in a sidelink subframe after subframe (n+4). In this case, the T-RPT may indicate the transmission location of data or the transmission location of SA (in case the SA is transmitted whenever retransmission (reTx) is performed. If the T-RPT directly indicates the transmission location of SA, data may be transmitted at the location apart therefrom by a PSCCH/PSSCH time offset. The T-RPT may not be repeated or applied by a predetermined number of times.

As a particular example of the T-RPT, the T-RPT may be applied starting from the location corresponding to 'n+4+ time offset between PSCCH/PSSCH' after receiving DCI. Alternatively, if the DCI is received in subframe n, SA may be transmitted in the closest sidelink subframe (subframe b) after subframe (n+4) (or SA may be transmitted in the location of '1' after applying a data T-RPT bitmap) and data may be transmitted at the location corresponding to 'b+time offset between PSCCH/PSSCH'. Alternatively, after applying the data T-RPT bitmap at the location corresponding to 'b+time offset between PSCCH/PSSCH', the data may be transmitted at the location of '1' in the T-RPT.

The time offset between the PSCCH and PSSCH (or PSCCH-PSSCH offset) may be determined in advance, or it may be signaled being included in the DCI as 2-or-3-bit information. If continuous data retransmission is scheduled, a retransmission number may be signaled without the T-RPT. That is, after the SA transmission, retransmission is performed by the number of retransmission rounds at the time when the offset is applied. A frequency hopping flag (e.g., 1 bit) may be signaled.

The frequency resource allocation information may be signaled on a sub-channel basis. Since the size and number of sub-channels may vary depending on resource pools, a resource (sub) pool index may be signaled. In this case, if frequency resources of SA and data resources are interconnected to each other, the start location of the data resource may be derived from the location of the SA resource, and only the end location of the data may be signaled. By doing so, the number of RA bits can be significantly reduced. In some cases, signaling may be performed on an RB basis as in the prior art for the purpose of forward compatibility.

Next, the PSCCH resource information may be included in the DCI for V2X. Here, the PSCCH resource information may correspond to a PSCCH resource index. For example, if the number of frequency resources for the PSCCH decreases (less than 50), a subframe location may be explicitly indicated using the remaining bits. If a single piece of DCI schedules multiple retransmission and the PSCCH is transmitted whenever the PSSCH is transmitted, a subframe for the PSCCH may be indicated using the T-RPT of data. When the DCI is received in subframe n, a data T-RPT bitmap may be applied to the closest sidelink subframe after subframe (n+4). Thereafter, after transmitting SA at the location of '1' in the bitmap, the data may be transmitted at the point obtained by applying a time offset between the SA and data.

As another example, if the number of times of SA transmission is different from that of data transmission, the T-RPT of SA may be separately signaled. In this case, it is possible to obtain the T-RPT of the data by applying the time offset between the SA and data (PSCCH-PSSCH offset) to the initial SA transmission location or perform the data transmission (continuously).

Meanwhile, if half duplex hopping is not applied to the PSCCH, the SA resource in a specific subframe may be considered as the PSCCH resource. In this case, the maximum number of PSCCH resources may be limited to 50. For the PSCCH resource index, 6 bits are used as it is. In V2X communication, if a PSCCH pool is FDMed with a PSSCH pool and the number of PSCCHs is limited to N (where N<50) in each subframe, the number of bits thereof may decrease.

The TPC command may be similar to that of conventional DCI format 5. The ID information may be included in the DCI or not.

The distributed/localized frequency allocation indicator may be included in the DCI. This is because if a distributed type of resource transmission is performed to satisfy PSD regulations, it should be distinguished. This field may be signaled per resource region or carrier through RRC or SIB.

Further, the DCI may include the SPS configuration index indicating which SPS configuration among multiple SPS configurations will be used.

Additionally, 1-bit information may be included in the DCI to indicate the activation/release. However, since there is no actual data in the case of the release, some or all of the resource allocation related field, T-RPT, time offset, SA resource, data resource, MCS, and the like may be set to a specific state (e.g., all zero) in order to indicate the release.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. Moreover, a rule may be defined such that information on whether the proposed methods are applied (or information on rules related to the proposed methods) should be transmitted from an eNB to a UE through a predefined signal (e.g., physical layer signal, higher layer signal, etc.), a transmitting UE signals the information to a receiving UE, or a receiving UE requests a transmitting UE to transmit the information. Meanwhile, some of the proposed contents may be applied to other communication except V2X communication, for example, direction communication between UEs (i.e., D2D communication other than V2X communication, and more particularly, a case where SPS communication is allowed in D2D communication), uplink, or downlink.

Device Configurations Embodiments According to the Present Invention

Figure 11:
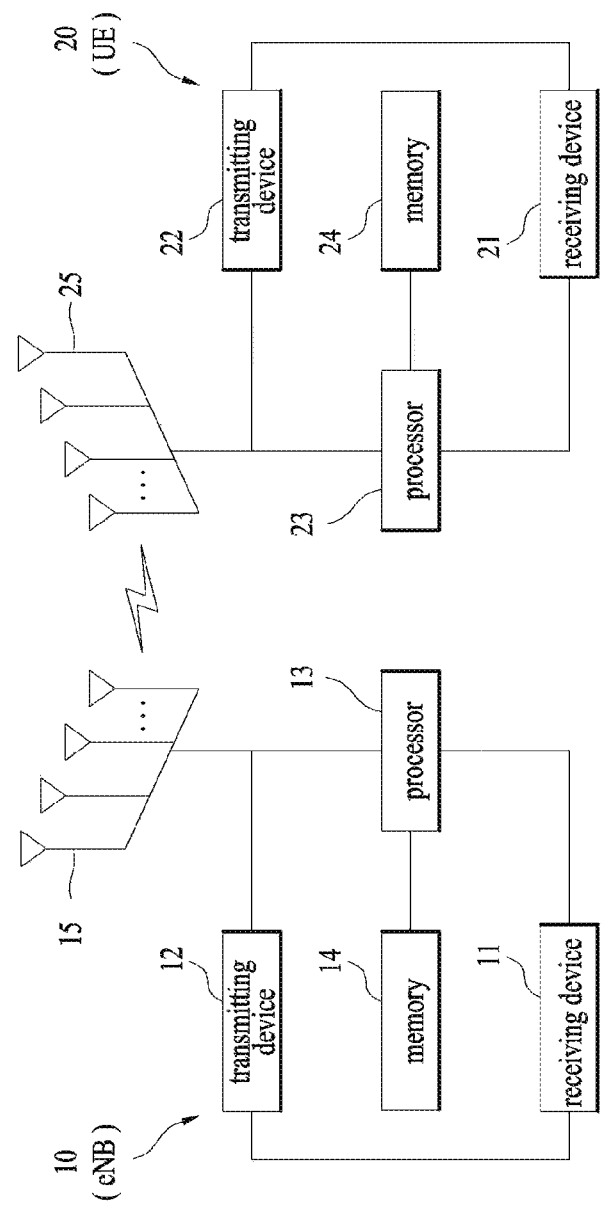
FIG. 11 is a block diagram of a transmission apparatus and a reception apparatus.

FIG. 11 is a diagram illustrating configurations of a transmission point device and a UE device according to an embodiment of the present invention.

Referring to FIG. 11, a transmission point device 10 may include a receiving module 11, a transmitting module 12, a processor 13, a memory 14, and a plurality of antennas 15. The plurality of the antennas 15 may mean that the transmission point device supports MIMO transmission and reception. The receiving module 11 may receive various signals, data and information from a UE in uplink. The transmitting module 12 may transmit various signals, data and information to the UE in downlink. The processor 13 may control overall operation of the transmission point device 10.

The processor 13 of the transmission point device 10 according to an embodiment of the present invention may perform the processes required in the above-described embodiments.

In addition, the processor 13 of the transmission point device 10 may perform a function of processing information received by the transmission point device 10, information to be transmitted by the transmission point device 10, and the like. The memory 14 may store the processed information during a prescribed time period and be substituted with a component such as a buffer (not shown in the drawing) or the like.

Referring to FIG. 11, a UE device 20 may include a receiving module 21, a transmitting module 22, a processor 23, a memory 24, and a plurality of antennas 25. The plurality of antennas 25 may mean that the UE device supports MIMO transmission and reception. The receiving module 21 may receive various signals, data and information from an eNB in downlink. The transmitting module 22 may transmit various signals, data and information to the eNB in uplink. The processor 23 may control overall operation of the UE device 20.

The processor 23 of the UE device 20 according to an embodiment of the present invention may perform the processes required in the above-described embodiments. Specifically, the processor may be configured to: receive, from the eNB, DCI including a T-RPT in subframe n through the receiving module; transmit a PSCCH in a sidelink subframe after subframe (n+4) through the transmitting module; apply the T-RPT starting from a subframe at a PSCCH-PSSCH offset from the subframe in which the PSCCH is transmitted; and transmit a PSSCH in subframes indicated by the T-RPT.

In addition, the processor 23 of the UE device 20 may perform a function of processing information received by the UE device 20, information to be transmitted by the UE device 20, and the like. The memory 24 may store the processed information during a prescribed time period and be substituted with a component such as a buffer (not shown in the drawing) or the like.

The configurations of the transmission point device and the UE device may be implemented such that the above-described embodiments can be independently applied or two or more thereof can be simultaneously applied, and redundant description is omitted for clarity The description of the transmission point device 10 in FIG. 11 may be equally applied to a relay as a downlink transmission entity or an uplink reception entity, and the description of the UE device 20 in FIG. 11 may be equally applied to a relay as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of transmitting and receiving sidelink signals by a User Equipment (UE) in a 3rd generation partnership project (3GPP)-based wireless communication system in which a subframe being a transmission time interval (TTI) of 1 ms, the method comprising:
   receiving, by the UE, Downlink Control Information (DCI) including a Time Resource Pattern for Transmission (T-RPT) in subframe n from a base station;
   transmitting, by the UE, a Physical Sidelink Control Channel (PSCCH) in a sidelink subframe after subframe (n+4);
   applying, by the UE, the T-RPT starting from a subframe, wherein the subframe is determined by applying a PSCCH-Physical Sidelink Shared Channel (PSSCH) offset to the sidelink subframe in which the PSCCH is transmitted; and
   transmitting, by the UE, a PSSCH and the PSCCH overlapped with the PSSCH simultaneously in subframes indicated by the T-RPT,
   wherein the PSCCH and the PSSCH are Frequency Division Multiplexed (FDMed) in the subframes indicated by the T-RPT, and
   wherein the UE determines a start frequency resource for the PSSCH from a location of the PSCCH in a frequency domain, and determines a last frequency resource for the PSSCH based on signaling from the base station, the signaling from the base station including information regarding the last frequency resource for the PSSCH without information regarding the start frequency resource for the PSSCH.

2. The method of claim 1, wherein among the subframes indicated by the T-RPT, at least one subframe in which a second or later PSSCH is to be transmitted is retransmission of a first PSSCH.

3. The method of claim 1, wherein the PSCCH includes a T-RPT identical to the T-RPT received through the DCI.

4. The method of claim 1, wherein the subframes indicated by the T-RPT includes the PSCCH.

5. The method of claim 1, wherein repeated application of the T-RPT is not allowed.

6. The method of claim 1, wherein the PSCCH is transmitted in a first sidelink subframe after subframe (n+4).

7. The method of claim 1, wherein the PSCCH is transmitted in a subframe indicated by the DCI among sidelink subframes after subframe (n+4).

8. The method of claim 1, wherein a first UE is a Vehicle-to-Everything (V2X) UE.

9. The method of claim 1, wherein frequency resources including the start frequency resource and the last frequency resource for transmitting the PSSCH are indicated on a sub-channel basis.

10. The method of claim 1, wherein the DCI includes a distributed/localized frequency allocation indicator.

11. The method of claim 1, wherein the DCI includes at least one of a Transmit Power Control (TPC) command, a Semi-Persistent Scheduling (SPS) configuration index, and an activation/release field.

12. A User Equipment (UE) for transmitting and receiving sidelink signals in a 3rd generation partnership project (3GPP)-based wireless communication system in which a subframe being a transmission time interval (TTI) of 1 ms, the UE comprising:
- a transmitting module;
- a receiving module; and
- a processor,
- wherein the processor is configured to:
- receive Downlink Control Information (DCI) including a Time Resource Pattern for Transmission (T-RPT) in subframe n from a base station through the receiving module,
- transmit a Physical Sidelink Control Channel (PSCCH) in a sidelink subframe after subframe (n+4) through the transmitting module,
- apply the T-RPT starting from a subframe,
- wherein the subframe is determined by applying a PSCCH-Physical Sidelink Shared Channel (PSSCH) offset to the sidelink subframe in which the PSCCH is transmitted; and
- transmit a PSSCH and the PSCCH overlapped with the PSSCH simultaneously in subframes indicated by the T-RPT,
- wherein the PSCCH and the PSSCH are Frequency Division Multiplexed (FDMed) in the subframes indicated by the T-RPT, and
- wherein the UE determines a start frequency resource for the PSSCH from a location of the PSCCH in a frequency domain, and determines a last frequency resource for the PSSCH based on signaling from the base station, the signaling from the base station including information regarding the last frequency resource for the PSSCH without information regarding the start frequency resource for the PSSCH.

* * * * *